(12) United States Patent
Liu et al.

(10) Patent No.: US 9,713,963 B2
(45) Date of Patent: Jul. 25, 2017

(54) METHOD AND APPARATUS FOR ROUTE COMPLETION LIKELIHOOD DISPLAY

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Michael Edward Loftus, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 807 days.

(21) Appl. No.: 13/769,416

(22) Filed: Feb. 18, 2013

(65) Prior Publication Data
US 2014/0236403 A1   Aug. 21, 2014

(51) Int. Cl.
*B60L 11/18* (2006.01)
*B60L 1/00* (2006.01)
*B60L 3/12* (2006.01)

(52) U.S. Cl.
CPC .......... *B60L 11/1862* (2013.01); *B60L 1/003* (2013.01); *B60L 3/12* (2013.01); *B60L 2240/34* (2013.01); *B60L 2240/622* (2013.01); *B60L 2240/66* (2013.01); *B60L 2240/662* (2013.01); *B60L 2240/68* (2013.01); *B60L 2240/72* (2013.01); *B60L 2240/80* (2013.01); *B60L 2250/10* (2013.01); *B60L 2250/12* (2013.01); *B60L 2250/14* (2013.01); *B60L 2250/16* (2013.01);
(Continued)

(58) Field of Classification Search
USPC .......................................... 701/22, 36, 400
See application file for complete search history.

(56) References Cited

U.S. PATENT DOCUMENTS

| 4,937,751 A | 6/1990 | Nimura et al. |
| 5,177,685 A | 1/1993 | Davis et al. |

(Continued)

FOREIGN PATENT DOCUMENTS

| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 mailed Mar. 4, 2010.
(Continued)

*Primary Examiner* — Todd Melton
*Assistant Examiner* — Jason Roberson
(74) *Attorney, Agent, or Firm* — Jennifer Stec; Brooks Kushman P.C.

(57) ABSTRACT

A system includes a processor configured to send likelihood-of-success request, including vehicle state information. The processor is further configured to receive information representing likelihood of reaching route points, utilizing a current vehicle charge, along with effects on the likelihood based on one or more power utilization changes. The processor is also configured to interactively display the received information and receive power utilization change selection. Also, the processor is configured to calculate a new likelihood of reaching the points based on the selection and display updated information based on the calculation.

7 Claims, 5 Drawing Sheets

(52) U.S. Cl.
CPC ....... *B60L 2250/18* (2013.01); *B60L 2250/20* (2013.01); *B60L 2260/50* (2013.01); *B60L 2260/52* (2013.01); *B60L 2260/54* (2013.01); *B60L 2260/58* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/162* (2013.01); *Y02T 90/163* (2013.01)

(56) References Cited

U.S. PATENT DOCUMENTS

| | | | |
|---|---|---|---|
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,487,002 A * | 1/1996 | Diller et al. | 701/1 |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,802,492 A | 9/1998 | DeLorme et al. | |
| 5,848,364 A | 12/1998 | Ohashi | |
| 5,901,806 A | 5/1999 | Takahashi | |
| 6,005,494 A | 12/1999 | Schramm | |
| 6,028,537 A | 2/2000 | Suman et al. | |
| 6,101,443 A | 8/2000 | Kato et al. | |
| 6,314,369 B1 | 11/2001 | Ito et al. | |
| 6,374,177 B1 | 4/2002 | Lee et al. | |
| 6,401,034 B1 | 6/2002 | Kaplan et al. | |
| 6,424,363 B1 | 7/2002 | Matsuba et al. | |
| 6,424,888 B1 | 7/2002 | Sone et al. | |
| 6,427,115 B1 | 7/2002 | Sekiyama | |
| 6,427,117 B1 | 7/2002 | Ito et al. | |
| 6,462,676 B1 | 10/2002 | Koizumi | |
| 6,484,092 B2 | 11/2002 | Seibel | |
| 6,484,093 B1 | 11/2002 | Ito et al. | |
| 6,487,477 B1 | 11/2002 | Woestman et al. | |
| 6,532,372 B1 | 3/2003 | Hwang | |
| 6,533,367 B1 | 3/2003 | Latarnik et al. | |
| 6,574,538 B2 | 6/2003 | Sasaki | |
| 6,574,551 B1 | 6/2003 | Maxwell et al. | |
| 6,608,887 B1 | 8/2003 | Reksten et al. | |
| 6,691,025 B2 | 2/2004 | Reimer | |
| 6,791,471 B2 | 9/2004 | Wehner et al. | |
| 6,829,529 B2 | 12/2004 | Trefzer et al. | |
| 6,834,229 B2 | 12/2004 | Rafiah et al. | |
| 6,866,349 B2 | 3/2005 | Sauter et al. | |
| 6,904,362 B2 | 6/2005 | Nakashima et al. | |
| 6,999,779 B1 | 2/2006 | Hashimoto | |
| 7,053,866 B1 | 5/2006 | Mimran | |
| 7,082,443 B1 | 7/2006 | Ashby | |
| 7,089,110 B2 | 8/2006 | Pechatnikov et al. | |
| 7,113,107 B2 | 9/2006 | Taylor | |
| 7,167,799 B1 | 1/2007 | Dolgov et al. | |
| 7,243,134 B2 | 7/2007 | Bruner et al. | |
| 7,286,931 B2 | 10/2007 | Kawasaki | |
| 7,315,259 B2 | 1/2008 | Sacks | |
| 7,369,938 B2 | 5/2008 | Scholl | |
| 7,421,334 B2 | 9/2008 | Dahlgren et al. | |
| 7,486,199 B2 | 2/2009 | Tengler et al. | |
| 7,571,042 B2 | 8/2009 | Taylor et al. | |
| 7,626,490 B2 | 12/2009 | Kashima | |
| 7,642,901 B2 | 1/2010 | Kato et al. | |
| 7,653,481 B2 | 1/2010 | Tramel | |
| 7,706,796 B2 | 4/2010 | Rimoni et al. | |
| 7,726,360 B2 | 6/2010 | Sato et al. | |
| 7,804,423 B2 | 9/2010 | Mudalige et al. | |
| 7,818,380 B2 | 10/2010 | Tamura et al. | |
| 7,822,380 B2 | 10/2010 | Wu | |
| 7,822,546 B2 | 10/2010 | Lee | |
| 7,826,945 B2 | 11/2010 | Zhang et al. | |
| 7,894,592 B2 | 2/2011 | Book et al. | |
| 7,920,969 B2 | 4/2011 | Mudalige et al. | |
| 8,121,802 B2 | 2/2012 | Grider et al. | |
| 8,145,376 B2 | 3/2012 | Sherony | |
| 8,290,704 B2 | 10/2012 | Bai | |
| 2001/0001847 A1 | 5/2001 | Hessing | |
| 2002/0087262 A1 | 7/2002 | Bullock et al. | |
| 2002/0152018 A1 | 10/2002 | Duckeck | |
| 2003/0028320 A1 | 2/2003 | Niitsuma | |
| 2003/0036848 A1 | 2/2003 | Sheha et al. | |
| 2003/0040866 A1 | 2/2003 | Kawakami | |
| 2003/0040868 A1 | 2/2003 | Fish et al. | |
| 2003/0158652 A1 | 8/2003 | Friedrichs et al. | |
| 2004/0021583 A1 | 2/2004 | Lau et al. | |
| 2004/0117108 A1 | 6/2004 | Nemeth | |
| 2004/0117113 A1 | 6/2004 | Friedrichs et al. | |
| 2005/0085956 A1 | 4/2005 | Losey | |
| 2005/0144573 A1 | 6/2005 | Moody et al. | |
| 2005/0159881 A1 | 7/2005 | Furukawa | |
| 2006/0025923 A1 | 2/2006 | Dotan et al. | |
| 2006/0026335 A1 | 2/2006 | Hodgson et al. | |
| 2006/0069504 A1 | 3/2006 | Bradley et al. | |
| 2006/0089788 A1 | 4/2006 | Laverty | |
| 2006/0145837 A1 | 7/2006 | Horton et al. | |
| 2006/0168627 A1 | 7/2006 | Zeinstra et al. | |
| 2006/0172745 A1 | 8/2006 | Knowles | |
| 2006/0184314 A1 | 8/2006 | Couckuyt et al. | |
| 2006/0190164 A1 | 8/2006 | Glaza | |
| 2006/0241857 A1 | 10/2006 | Onishi et al. | |
| 2006/0282214 A1 | 12/2006 | Wolterman | |
| 2007/0005241 A1 | 1/2007 | Sumizawa et al. | |
| 2007/0038362 A1 | 2/2007 | Gueziec | |
| 2007/0050248 A1 | 3/2007 | Huang et al. | |
| 2007/0093955 A1 | 4/2007 | Hughes | |
| 2007/0104224 A1 | 5/2007 | Conner et al. | |
| 2007/0143013 A1 | 6/2007 | Breen | |
| 2007/0143482 A1 | 6/2007 | Zancho | |
| 2007/0143798 A1 | 6/2007 | Jira et al. | |
| 2007/0198172 A1 | 8/2007 | Sumizawa et al. | |
| 2007/0203643 A1 | 8/2007 | Ramaswamy et al. | |
| 2007/0203646 A1 | 8/2007 | Diaz et al. | |
| 2007/0213092 A1 | 9/2007 | Geelen | |
| 2007/0219706 A1 | 9/2007 | Sheynblat | |
| 2007/0273624 A1 | 11/2007 | Geelen | |
| 2007/0290839 A1 | 12/2007 | Uyeki et al. | |
| 2008/0005734 A1 | 1/2008 | Poristoin et al. | |
| 2008/0065318 A1 | 3/2008 | Ho | |
| 2008/0082260 A1 | 4/2008 | Kimura | |
| 2008/0114534 A1 | 5/2008 | Yamazaki et al. | |
| 2008/0147305 A1 | 6/2008 | Kawamata et al. | |
| 2008/0147308 A1 | 6/2008 | Howard et al. | |
| 2008/0162034 A1 | 7/2008 | Breen | |
| 2008/0195305 A1 | 8/2008 | Jendbro et al. | |
| 2008/0228346 A1 | 9/2008 | Lucas et al. | |
| 2008/0303693 A1 | 12/2008 | Link, II | |
| 2009/0055091 A1 | 2/2009 | Hines et al. | |
| 2009/0063042 A1 | 3/2009 | Santesson et al. | |
| 2009/0083627 A1 | 3/2009 | Onda et al. | |
| 2009/0143934 A1 | 6/2009 | Motonaga et al. | |
| 2009/0177384 A1 | 7/2009 | Walder | |
| 2009/0186596 A1 | 7/2009 | Kaltsukis | |
| 2009/0192688 A1 | 7/2009 | Padmanabhan et al. | |
| 2009/0196294 A1 | 8/2009 | Black et al. | |
| 2009/0216434 A1 | 8/2009 | Panganiban et al. | |
| 2009/0228172 A1 | 9/2009 | Markyvech et al. | |
| 2009/0254266 A1 | 10/2009 | Altrichter et al. | |
| 2009/0259354 A1 | 10/2009 | Krupadanam et al. | |
| 2009/0326797 A1 | 12/2009 | Tengler et al. | |
| 2009/0326801 A1 | 12/2009 | Johnson et al. | |
| 2010/0010732 A1 | 1/2010 | Hartman | |
| 2010/0048184 A1 | 2/2010 | Kim | |
| 2010/0088018 A1 | 4/2010 | Tsurutome et al. | |
| 2010/0088029 A1 | 4/2010 | Hu et al. | |
| 2010/0094500 A1 | 4/2010 | Jin | |
| 2010/0094550 A1 | 4/2010 | Tsurutome et al. | |
| 2010/0138151 A1 | 6/2010 | Jang et al. | |
| 2010/0174485 A1 | 7/2010 | Taylor et al. | |
| 2010/0191463 A1 | 7/2010 | Berry et al. | |
| 2010/0198508 A1 | 8/2010 | Tang | |

(56) References Cited

U.S. PATENT DOCUMENTS

| | | |
|---|---|---|
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0003578 A1 | 1/2011 | Chen et al. |
| 2011/0004523 A1 | 1/2011 | Giuli et al. |
| 2011/0028118 A1 | 2/2011 | Thomas |
| 2011/0046883 A1 | 2/2011 | Ross et al. |
| 2011/0166774 A1 | 7/2011 | Schunder |
| 2011/0178811 A1 | 7/2011 | Sheridan |
| 2011/0221586 A1 | 9/2011 | Eikelenberg et al. |
| 2011/0238289 A1 | 9/2011 | Lehmann et al. |
| 2011/0246016 A1 | 10/2011 | Vang et al. |
| 2011/0255481 A1 | 10/2011 | Sumcad et al. |
| 2012/0004841 A1 | 1/2012 | Schunder |
| 2012/0029806 A1 | 2/2012 | Scalf et al. |
| 2012/0029807 A1 | 2/2012 | Schunder et al. |
| 2012/0041673 A1 | 2/2012 | Vandivier et al. |
| 2012/0053825 A1 | 3/2012 | Schunder |
| 2012/0173134 A1* | 7/2012 | Gutman .................. 701/400 |
| 2013/0030630 A1* | 1/2013 | Luke et al. .............. 701/22 |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 | 4/2008 |

OTHER PUBLICATIONS

International Searching Authority, The International Search Report and the Written Opinion of the International Searching Authority for the corresponding International Application No. PCT/US2010/23887 mailed Apr. 12, 2010.

Patent Cooperation Treaty, International Preliminary Examining Authority, International Preliminary Report on Patentability for the corresponding PCT/US10/23887 mailed Apr. 29, 2011.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

\* cited by examiner

METHOD AND APPARATUS FOR ROUTE COMPLETION LIKELIHOOD DISPLAY

TECHNICAL FIELD

The illustrative embodiments generally relate to a method and apparatus for route completion likelihood display.

BACKGROUND

Battery electric vehicles (BEVs) are being championed by many governments, OEMs, and some startup companies and entrepreneurs. It is expected that many BEVs will be deployed within a year or so in US and other countries to ascertain the potential viability of the vehicles for personal transportation. However, range anxiety is still major hurdle for electric vehicle (EV) adoption. Cars.com surveyed 1000 prospective buyers and found that 54% were very concerned about range anxiety they might have in pure electric cars. These prospective customers also did not appear to be patient about charging. Because of the generally short driving range of BEVs, ready accessibility of charging facilities and/or battery-supply infrastructure will be a prerequisite for developing a mature BEV-based transportation system. In addition, more careful planning on the part of the drivers will be helpful to avoid being stranded due to drained batteries. A stranded BEV not only is an inconvenience to the vehicle occupants and can pose potential danger to them, but can also lead to traffic congestion, collisions and other problems.

There are also potentially significant traffic management problems associated with BEV stopping in traffic with drained batteries. Suppose, for example, that in New York City where 750,000 cars and truck driver drive every day 5% of the vehicles are BEVs. If on an expectantly cold day where BEV energy consumption is high, 5% of the vehicles are stranded. There would be 1875 stalled vehicles. Even one stalled vehicle can delay 75,000 motorists, 1875 could create super-jams that could take days to unravel.

Currently, some EVs have LCD displays in gauge clusters and center stacks, that advise drivers on how much charge is remaining, and the time required to fully charge. They also display trip information and energy routing, and do double duty to control vehicle climate and infotainment settings. Although they estimate how many miles the driver can still travel without any measure of the accuracy of the estimate, none of them shows the drivers the likelihood of reaching the destination by different routing or different behaviors, and the trade-off options they get to traverse the route. A lot of drivers will be impatient when stopping and charging on their way, and would rather wait until they reach their destination, so they can make good use of their time while the BEV is charging.

It is desirable to avoid being stranded with appropriate planning when driving a BEV. There are other factors that can be accounted for trip planning that impact the driving range. They include heater or air-condition use, media players on or off, tire pressure, terrain gradient, ambient temperature, wind velocity, the choices of routes, etc. A driver could acquire the necessary information and make plans while driving the vehicle. Current route guidance systems lack an effective way to present the changing accuracy of the energy consumption forecast in a way that is easy to understand and provides the driver information about the accuracy of the estimate, and how the range can be improved by making the correct driving decisions.

U.S. Pat. No. 8,121,802 discusses methods and apparatus to provide a power-line communication method, a power-line communication device, and a power-line communication system, which can make communication with high communication efficiency even when the condition of a power line is changed. A noise detection process is performed in correspondence to a time domain synchronized with a power source cycle of a power line. A communication channel decision process of generating communication channels in the time domain is performed on the basis of the noise condition detected. Tone maps are prepared for the communication channels generated. When the preparation of the tone maps is ended, the tone maps are transmitted to a destination PLC and data are transmitted and received between a transmission-side PLC and a reception-side PLC by the use of the same tone map.

SUMMARY

In a first illustrative embodiment, a system includes a processor configured to send likelihood-of-success request, including vehicle state information. The processor is further configured to receive information representing likelihood of reaching route points, utilizing a current vehicle charge, along with effects on the likelihood based on one or more power utilization changes. The processor is also configured to interactively display the received information and receive power utilization change selection. Also, the processor is configured to calculate a new likelihood of reaching the points based on the selection and display updated information based on the calculation.

In a second illustrative embodiment, a system includes a processor configured to receive a request for route-success likelihood calculation. The processor is further configured to receive vehicle data and gather route-data affecting power usage. The processor is additionally configured to calculate varied percentage chances of reaching a plurality of points along a route, based at least in part on the received and gathered data. The processor is further configured to calculate one or more percentage chance changes based on possible power utilization changes and return the calculated varied percentage chances and percentage chance changes to a requesting entity.

In a third illustrative embodiment, a system includes a processor configured to receive selection of one or more power utilization changes affecting a projected vehicle range. The processor is also configured to determine if any of the selected power utilization changes correspond to lockable vehicle systems. The processor is further configured to lock-out the lockable vehicle systems to prevent utilization of the lockable vehicle systems for the duration of a journey.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
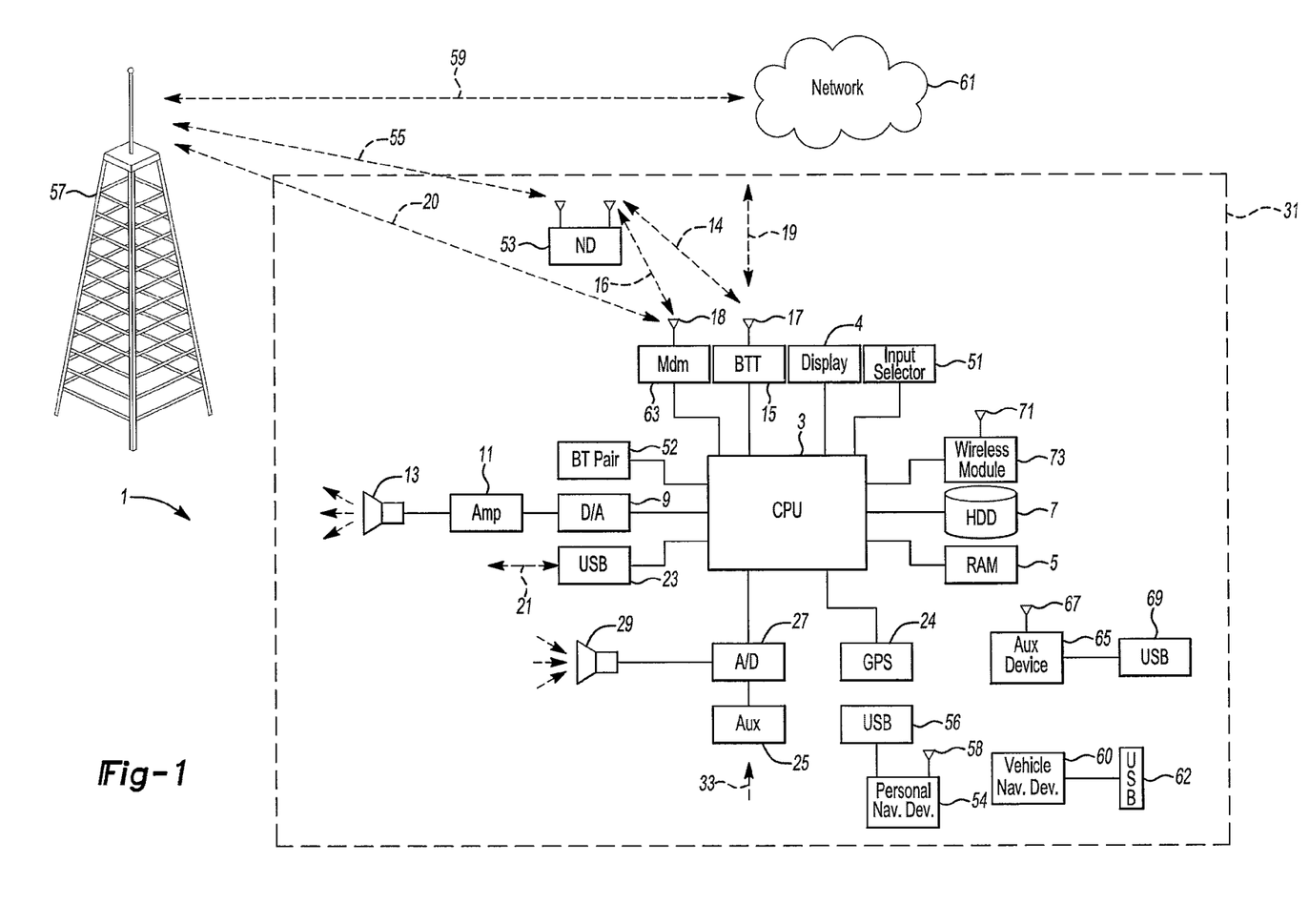
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided or voice, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments disclose a driver assistance system to:

1) Inform the driver of the driving range, and the likelihood of successfully traversing the routes. It may display the place/point (miles) the drive could reach for sure (100% probability) on the route, based on the current situation in the vehicle, such as what media is on, the driving (braking/speeding) pattern of the driver, current environment vehicle is in (wind, temperature . . . )

2) Help ensure that the driver can plan his/her trip to reach his/her destination and back in a cost/time effective manner. It will display the likelihood of reaching the remaining part of the routes from the point it identified in 1). In general, the likelihood of reaching a destination will improve the closer the vehicle gets to the destination, so the color of the route on the display may be lighter.

3) Offer the trade-off options to drivers in case the "juice" is low. The driver could choose from different options to increase the likelihood of reaching the destination, such as 10% probability increase if turning off the media; 20% probability increase if turning off the air conditioner; 5% probability increase if choosing road coaster; 10% probability increase if changing to a flat route etc.

4) Update the estimates/likelihood when drivers change their behaviors or the environment changes.

5) Transmit information about the vehicle location, vehicle and battery type to a battery recharging or swapping station, which can then develop efficient logistics to best serve the vehicle as necessary, and in the case where the vehicle is stranded due to battery drainage, dispatch a mobile unit to charge the drained battery.

The decision support system described herein helps a driver choose a route using the position of charging stations, and charging times, and displaying the route with different colors and thicknesses depending on the likelihood of reaching that part of the route. Route guidance systems may use forecasts of the weather and traffic, as well as knowledge of the topography to estimate how far the remaining charge will take a vehicle along any specific route. Estimates of the accuracy of these forecasts can also be made using mathematical models of forecast accuracy. Further, estimates of the stochastic nature of forecast data can also be made to represent, for example, turbulence of wind flows and vehicle-to-vehicle variability in micro-traffic conditions and fluctuations in driver behavior. Rerouting will occur, while the vehicle is underway as the forecasts and accuracy estimates are based on the most updated situation.

FORD has been developing prototypes of a VCS that can provide a framework for a driver-assistance system for BEVs. The VCS provides easy access to information from the driver, from navigation systems, from the Internet and from the drive-train and chassis systems. It is able to learn the driver's driving behaviors and output concise information which is useful for making a decision. The system architecture and implementation is intended to allow the insertion of new software devices that can take advantage of the existing infrastructure. Such a software device is proposed to assist BEV owners and increase their satisfaction with their vehicles. The VCS will supply the device with filtered information from the several sources so that only relevant data is considered. The data is analyzed in the software device to produce useful information that is displayed using the VCS display, and spoken dialog system.

To determine the driving range of the vehicle, a separate power-train system analysis tool will be used. The input data for this tool can include, but is not limited to (1) information regarding the state of charge of the battery, the predicted traffic speed and oscillation acceleration, and the forecast ambient wind and temperature that can influence the battery performance and discharge rate, and (2) information on vehicle location, travel direction relative to the wind, and terrain gradient encountered by the vehicle in its present and anticipated traveling direction. If the driver inputs the travel destination, then the tool will determine the expected driving range relative to the destination. If the driver does not input a specific destination, then the analysis tool will determine the periphery of for example, 80% of the estimated driving ranges in different directions relative to the vehicle location. This periphery will be constantly updated, and as the driving range decreases, the periphery of the actual driving range will be estimated.

When the BEV is started with a key, the VCS may ask the driver: "What is the plan?" Because planning will be very important to BEV drivers, this establishes a planning habit that will be necessary for the driver to enjoy the vehicle. The driver may say "I need to go home." The VCS may respond by saying, "I don't have enough charge for you to go home. The likelihood you can reach a charging location 5 miles away from home is 99%, but there is only a 10% likelihood that you can reach home." The LCD display then may output a range indication that ensures the driver has a geographic visualization of the available range and also show the farthest point you will reach on your route for sure based on current situation, then from there, the colors and thicknesses are getting lighter depending on the likelihood of reaching that part of the route.

At the same time, the VCS may offer a driver some options of getting home without charging on the route: 1) 10% likelihood increase if the driver turns off the air conditioner (so should be able to reach home without recharging); 2) 5% likelihood increase if the driver turns off all the media, 3) 5% likelihood increase if the driver drives more even speedily (change driving behaviors), 4) 10% likelihood increase if the driver changes to the local (non-highway) route, etc. The driver then could either turn off the air conditioner, or turn off all the media and brake less or change route. By making these trade-offs, the likelihood the driver can reach home successfully is quite high.

Figure 2:
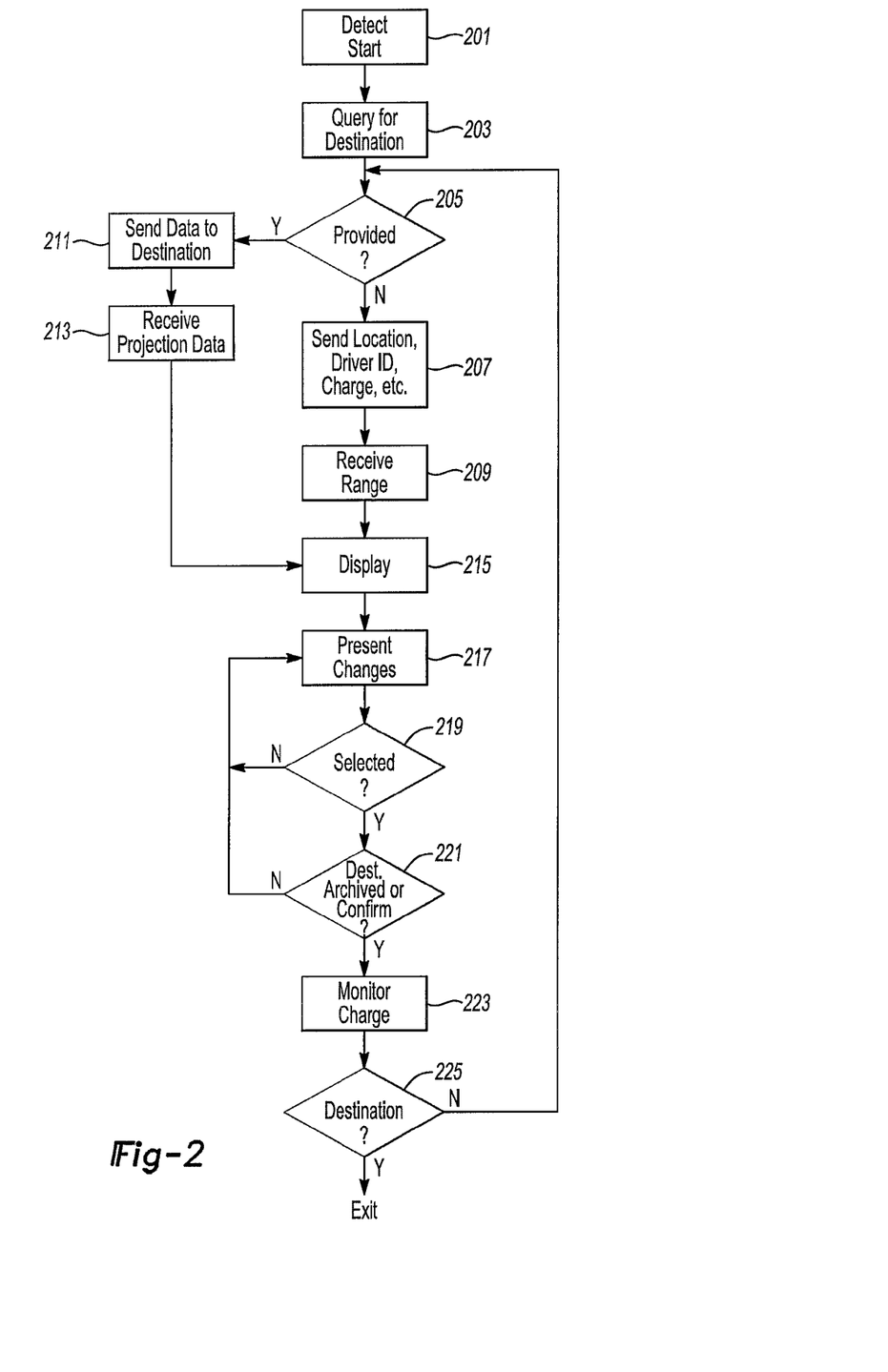
FIG. 2 shows an illustrative process for destination projection data processing.

FIG. 2 shows an illustrative process for destination projection data processing. In this illustrative example, the process detects that a vehicle has been started 201. Although not necessary, in this illustrative example, the process is provided in a BEV, and, in order to facilitate a cleaner user experience, may begin upon vehicle startup. In other instances, the process may be requested by a driver. Once the process has been initiated, it requests a destination 203. In this example, the process is capable of displaying likelihood-of-success (LoS) data whether or not a destination is input. If a destination is not provided 205, then some information relating to various likely vehicle ranges may be displayed.

If the destination is not provided, the process may send vehicle location, a driver profile or ID, a state of charge, and any other relevant information 207 to a remote server (or the calculation process may be performed locally. The driver ID or profile may be relevant because different drivers may achieve different fuel/energy economy (collectively, simply "economy") values based on driving behaviors. The data relating to driving behaviors and/or observed economies may be stored locally in a vehicle, on a wireless device connected to the vehicle, or in a remote location such as on a remote server.

Figure 6:
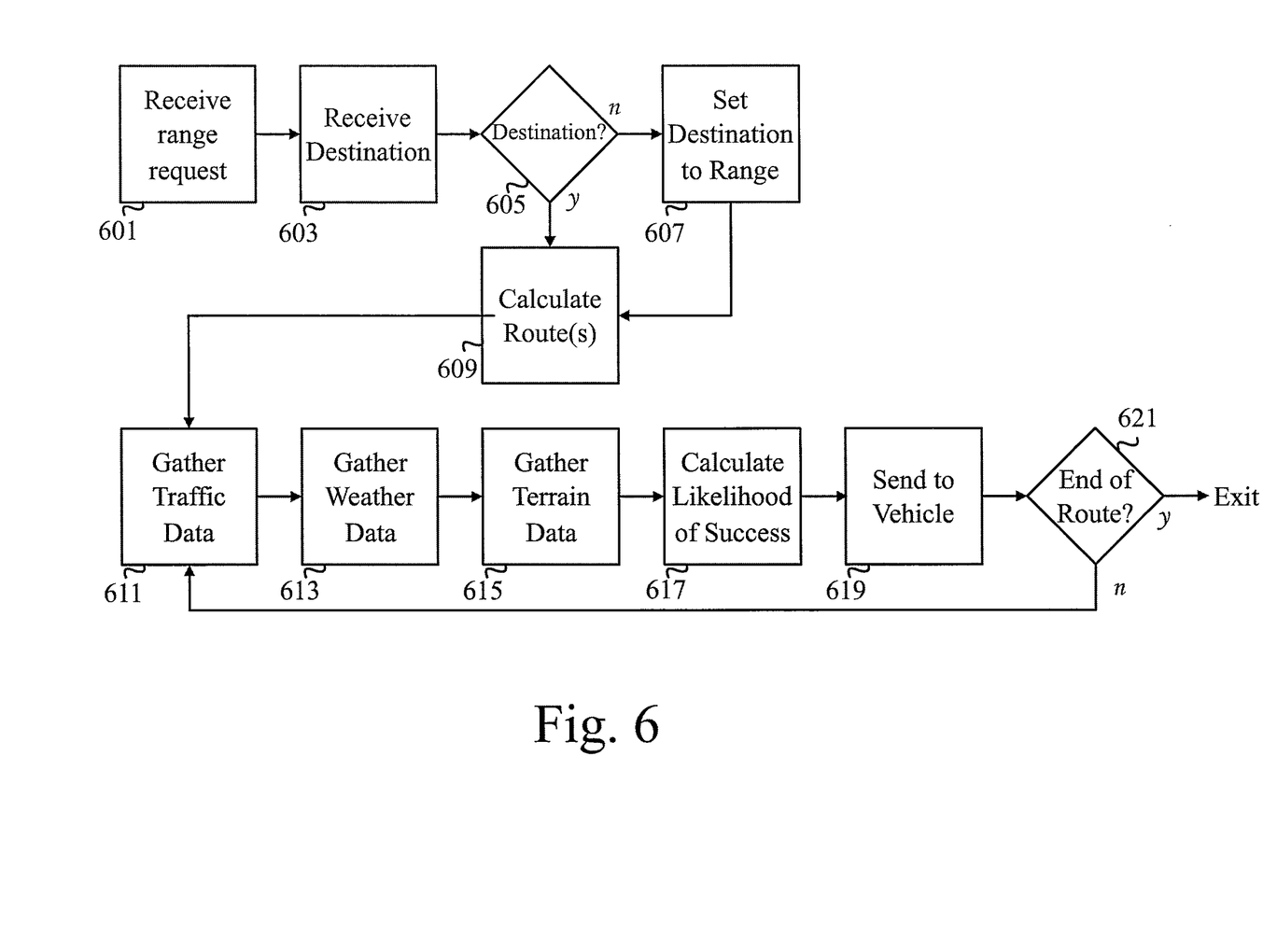
FIG. 6 shows an illustrative process for destination data calculations.

The calculation entity, in this case a server, will then perform the necessary calculations as discussed in greater details by example in FIG. 6. The forecasted ranges will be received 209, and they can be displayed for the driver's review 215.

In other instances, the driver may provide a destination 205. In such a case, the range may or may not be generally calculated. Since range calculation may require additional computing time, the process may first address a specific route calculation and then provide range at a later time or upon request. In this example, the destination (and route data if local calculation is performed) may be sent to the calculation entity, along with the additional vehicle and driver data as discussed above 211. Following calculation, projection data may be received by the process 213 and displayed for the driver's perusal 215.

In some cases, the likelihood of a driver reaching a destination may be below a desirable or predetermined threshold. For example, there may only be an 85% likelihood of a driver reaching a desired destination. Since the driver does not (with all likelihood) wish to be stranded, it may be desirable to take one or more steps to avoid running out of power or to at least increase the likelihood that such a situation can be avoided. In this example, the process, based on known power usage of vehicle systems, route information (traffic, terrain, weather, etc.) and known or projected driving behavior, may present one or more options for increasing the likelihood of destination achievement and/or to reduce overall power usage in general 217.

The driver may select one or more of the listed options 219 to see how the projection would change. Once an option is selected, a new display of the projected ranges/destination likelihood may occur, showing the driver the effect of the selected change(s). If the destination is achieved or the driver confirms that all proper changes have been selected 221, the process may then monitor a vehicle charge 223.

In some cases, the change may be a new route, in which case the new route may be shown. In other cases, the change may be a change in driver behavior. Since it is difficult to know if the driver will actually stick to the new behavior, the system may provide suggestions about behavior as the vehicle is in progress, but otherwise simply track and update charge states. In another example, the changes may include changes to a vehicle's optional power systems (music, HVAC, etc.). In these cases, the system may provide an option to "lock out" the various systems, in order to assist the driver, in case the driver forgets that the systems are not to be used in order to achieve the destination with a degree of likelihood. Such lockouts are discussed in greater detail with respect to FIG. 5.

Once an acceptable (if any) set of changes has been made, the process will then continue to monitor the battery charge (and/or reserve fuel for a conventional vehicle) for the duration of the route 223. Until the destination is reached 225, the process may continue to provide updated information for the driver. This can allow the driver to see the actual likelihood of reaching a destination is as time progresses, since weather, traffic, and driving patterns can change. Further, changes to driving behaviors, routes, vehicle power states, etc. can be implemented at any time, if the chance of reaching a destination falls too low. Similarly, systems can be turned on and driving behavior can revert to normal if the likelihood of reaching the destination rises above an acceptable threshold.

Figure 3:
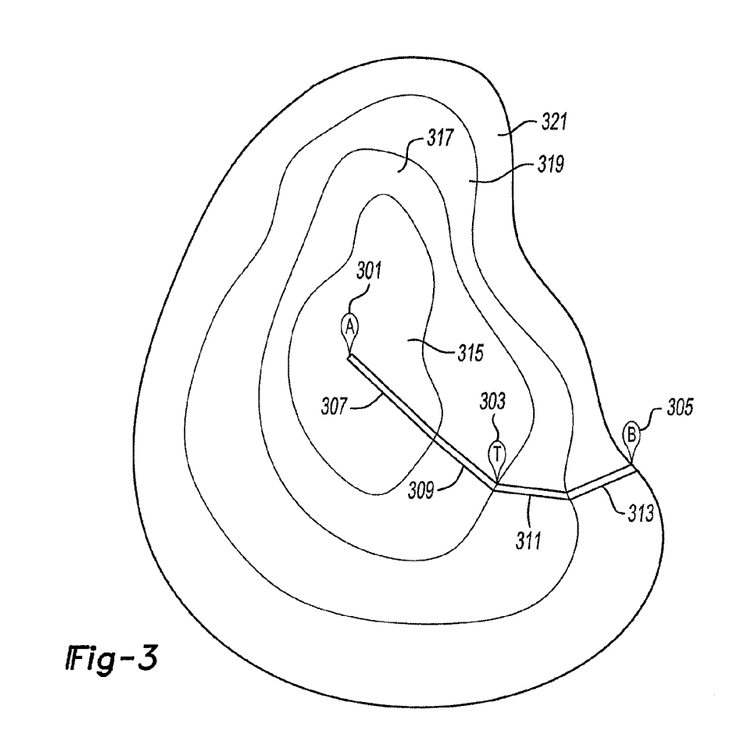
FIG. 3 shows an illustrative display of a route and ranges.

FIG. 3 shows an illustrative display of a route and ranges. In this illustrative example, the driver begins driving at position A 301. While both general ranges and a route (in a vectored sense) are displayed, the process or driver may elect to only show/view one of the displays as opposed to both. Here, the destination is designated by B 305. Along the vectored route, a point T 303 is also shown. This represents the point where it is likely, above a certain threshold (e.g., without limitation, 90%) that can be reached by a driver. Threshold variances can be adjusted by a driver as well as changing the value at which T is displayed, so that a risk-adverse driver can, for example, have T displayed only at the edge of the 100% range.

In this example, the route is shown in vector form. If desired, the route could map to the actual roads, but since the display may be of a large area (e.g., 100 miles) and many roads may not appear on such a zoomed-out map, the process may show the vectors as a more convenient way of generally representing points along a route which can be reached with varying likelihoods of success. Here, segment 307 represents the vector along which the driver is likely to achieve 100% chance of completion. A similarly bounded area 315, shows the likelihood of reaching a point in any given direction.

With respect to the area 315, the boundary changes because of varied elevations, traffic, road speeds, weather, etc. Also, reference points may be used to define certain points along the boundary, and then the calculation engine may extrapolate likely boundaries between those points, to avoid the time that may be needed to calculate every conceivable point defining a boundary. Once overlaid on a map view, the boundaries should serve as a reasonable guide to drivers as to an obtainable distance with a certain degree of likelihood.

Next, the segment 309 of the vector is shown, representing the likelihood of reaching a point with 90% probability (at the outer end). The corresponding boundary for this vector is represented by 317. In this example (although not shown), the different vectors/boundaries may be shown in varied colors, to further aid the driver in recognizing a likelihood of success. For example, without limitation, the process may display a dark green for 100%, lighter green for 90%, lightest green/yellow for 80%, yellow for 70%, orange for 60%, red for <50%. Variances of suitable colors of any type may be used (or other varied designations), to the extent that such varied display is desired, and the percentages at which the variances change may be modified by an OEM or a driver based on acceptable degree of risk, for example.

Beyond section 309 are sections 311 and 313, to which bounded areas 319 and 321 respectively correspond. These represent the 80% and 70% likelihoods of achieving a destination, in this example. Since a driver headed to point B may not want to undertake a journey with a projected ⅓ chance of failure (approximately), the driver may wish to take steps to ensure that the likelihood rises and achieving the destination has a higher chance of success.

Figure 4:
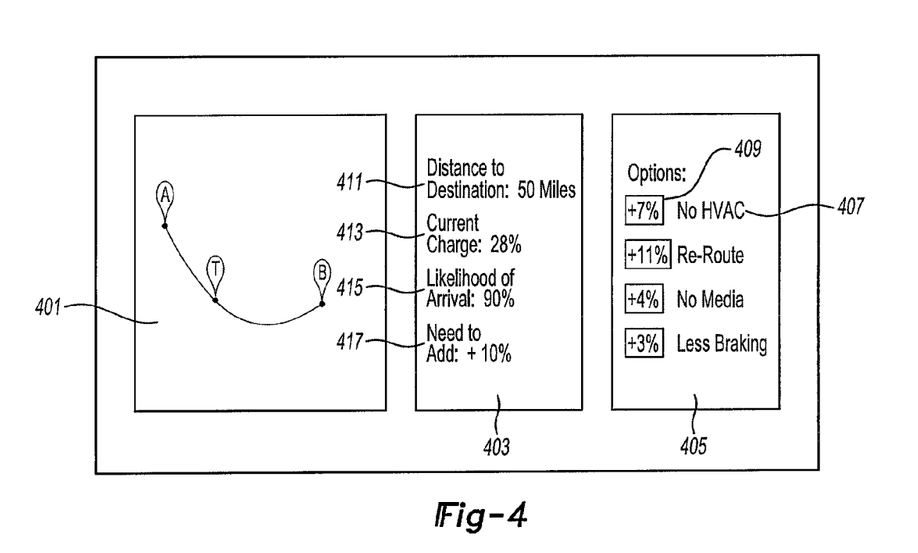
FIG. 4 shows an illustrative vehicle display.

FIG. 4 shows an illustrative vehicle display. In this example, the vectored route from FIG. 3 is shown as a portion 401 of a navigation display. Similarly, the display could be provided on a wireless device in communication with a vehicle or in other suitable format (such as an audio output, if no display were available). In this example, additional information about the vehicle and the route is shown in element 403.

Element 403 contains some visual information related to the route in question. A distance to the destination 411 is shown, along with a current battery charge 413. Not shown, but also possible, would be a recommended charge to reach the destination, in case the user was in a position where the vehicle could easily be charged. Further, the process shows a current likelihood of arrival 415. Here, the likelihood of arrival is 90% (as opposed to the 70% of FIG. 3), indicating that the driver needs to increase the likelihood by 10% 417 in order to have 100% (or close thereto) chance of successful arrival.

In conjunction with the other displays, the process shows a number of options for the driver to increase a chance of successful arrival 405. The options, which are touch selectable in this example, include both a percentage increase 409 and a description of what the option entails 407. The driver can select one or more options and, in this case, see an update to the display, signifying the change resulting from the update. Shown here, in a non-limiting fashion, are proposed changes to HVAC, a re-route option (avoid traffic, hills, weather, etc.), a no-media option and a driving behavior change option. Other options are, of course, possible, assuming they affect the efficiency of travel.

Figure 5:
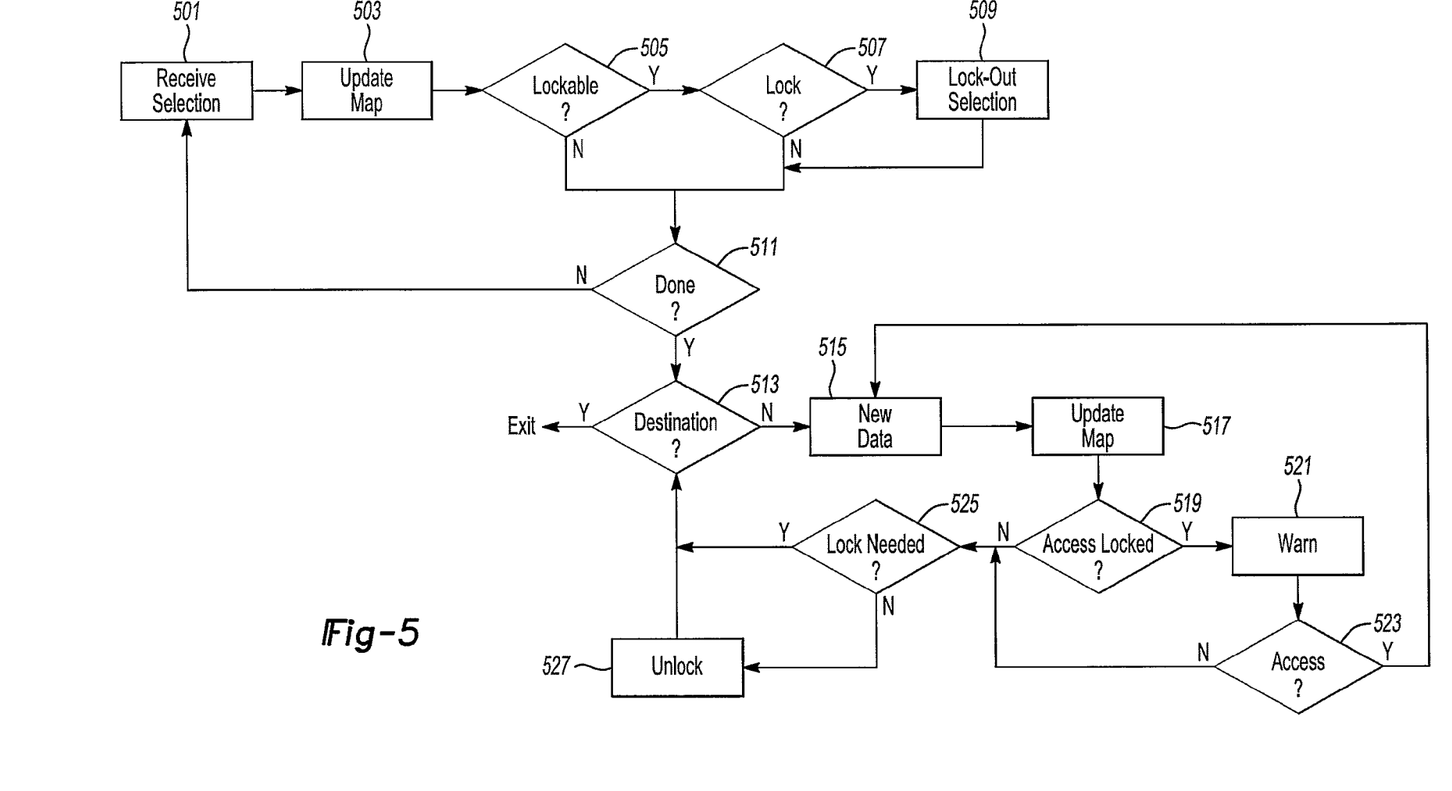
FIG. 5 shows an illustrative process for state change handling.

FIG. 5 shows an illustrative process for state change handling. In this illustrative embodiment, the process receives a selection of one or more changes that may affect the efficiency of the vehicle and its ability to reach a destination with a degree of likelihood 501. The map may be updated to reflect the change 503, and then the process checks to see if the option is a "lockable" option 505.

Lockable options, in this example, are options such as HVAC or media that can be locked out by the vehicle. Since the driver may not want to automatically lock out an option, the process may ask the driver if a lock-out is desired 507. If the driver agrees, the option can be locked out from use 509, or at least prevented on a temporary basis. In other cases, the driver may have preset an automatic lock-out or non-lock-out of various options or all options.

If the driver has completed selection of options 511, the process checks to see if a destination has yet been achieved 513. If the destination is not reached, the process will, as the driver travels, continue to process new data 515 (e.g., without limitation, vehicle charge changes, system usage, etc.). The process will also continue to update the map as the vehicle travels 517, so the driver can continually check the likelihood of achieving a destination, and make changes if necessary.

At some point along a route, the driver may attempt to access a locked system 519. For example, if it is 98 degrees outside, the driver may wish to, even briefly, turn on the AC. But, at the start of the trip, the driver may have elected to lock out the HVAC system to decrease the load on the battery. If the driver attempts to access a locked system, the process may warn the driver 521 that the requested system is locked. If the driver still wishes to proceed 523, the process may then send the new data 515 to the calculation engine for processing and updates.

Additionally along the trip, the system may reach a point where a lock is no longer needed 525. For example, since systems may over-estimate power requirements, in order to reduce the likelihood of a bad estimate, the driver may be halfway home and the system may determine with some degree of certainty that home can be reached even if a locked system is employed. In such a case, the system may unlock the feature on its own 527, and notify the driver that the locked system can be utilized. The updating and lock checking can continue until the destination is reached.

FIG. 6 shows an illustrative process for destination data calculations. In this illustrative example, an exemplary process performed by the calculation engine is described. The engine may receive a request for range/likelihood of success, and accompanying vehicle state information 601. This information can also include driver info and any other relevant information. In some cases, a destination may also be received 603.

If the destination is unknown 605, the process may set the destination variable as a "range" 607. Range, in this example, tells the system to calculate a series of projected ranges based on degrees of likely success. In other cases, the process may receive the destination and, accordingly, calculate a route 609.

For the destination=range case, the process may calculate a number of routes heading in varied directions 609. In these instances, cardinal directions may be used, or other suitable variables. For example, if the driver is in a NW sector of a city, and only a single road leads NW, the process may only calculate one vector in that direction, and a number of vectors to the east and south (towards the city). Appropriate adjustments can be made to minimize processing time while maximizing information, depending on the desired level of both.

Along the route or routes, traffic data 611, weather data 613, terrain data 615 and other data can be gathered, all of which may affect the likelihood of reaching a destination. If known, street speed and stop sign/light data may also be gathered, along with any other reasonable data affecting the travel outcome. Once the appropriate data has been gathered, the process may calculate a likelihood of success 617 and send that data to the vehicle (unless the process is done onboard) 619 for display. This process can repeat until a destination is reached 621.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a request for a route-success probability calculation;
receive vehicle data;
gather route-data affecting vehicle power usage;
calculate varied percentage chances of reaching a plurality of points along a route, based at least in part on the received and gathered data;
calculate percentage chance changes based on possible vehicle system power utilization changes; and
return the calculated varied percentage chances and percentage chance changes to a requesting entity.

2. The system of claim 1, wherein the vehicle data includes a vehicle location.

3. The system of claim 1, wherein the vehicle data includes a vehicle destination.

4. The system of claim 1, wherein the vehicle data includes a vehicle charge level.

5. The system of claim 1, wherein the vehicle data includes a driver profile.

6. The system of claim 1, wherein the vehicle data includes a vehicle identification.

7. The system of claim 1, wherein the route-data includes at least one of traffic, weather, traffic feature or terrain data.

* * * * *